(No Model.)

L. H. WATTLES.
DRIVING CONNECTION OR BELT FOR BICYCLES.

No. 585,416. Patented June 29, 1897.

WITNESSES.
Charles T. Hannigan
Remington Sherman

INVENTOR.
Luther H. Wattles
By Geo. H. Remington & Co.
Atty.

THE NORRIS PETERS CO., PHOTO-LITHO., WASHINGTON, D. C.

UNITED STATES PATENT OFFICE.

LUTHER H. WATTLES, OF PROVIDENCE, RHODE ISLAND, ASSIGNOR OF ONE-HALF TO WILLIAM B. SHERMAN, OF SAME PLACE.

DRIVING CONNECTION OR BELT FOR BICYCLES.

SPECIFICATION forming part of Letters Patent No. 585,416, dated June 29, 1897.

Application filed September 24, 1896. Serial No. 606,838. (No model.)

*To all whom it may concern:*

Be it known that I, LUTHER H. WATTLES, a citizen of the United States, residing at Providence, in the county of Providence and State of Rhode Island, have invented certain new and useful Improvements in Driving Connections or Belts for Bicycles and the Like; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to driving-gear for bicycles or other analogous vehicles; and the object I have in view is to produce a flexible driving connection for bicycles and the like, the same possessing greater strength, elasticity, and holding capacity or adhesiveness than driving-belts heretofore employed in vehicles of this class.

Figure 1:
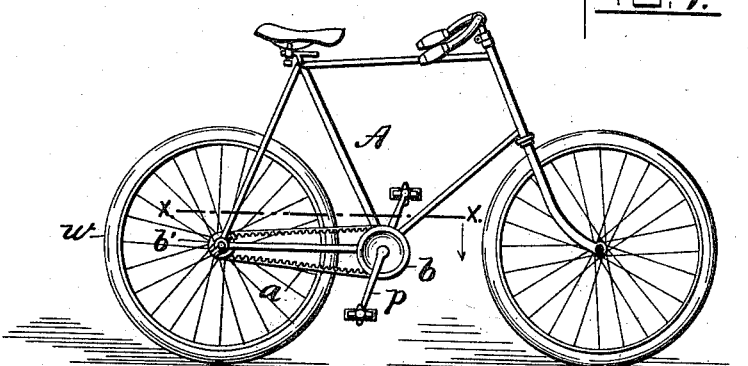
Figure 2:
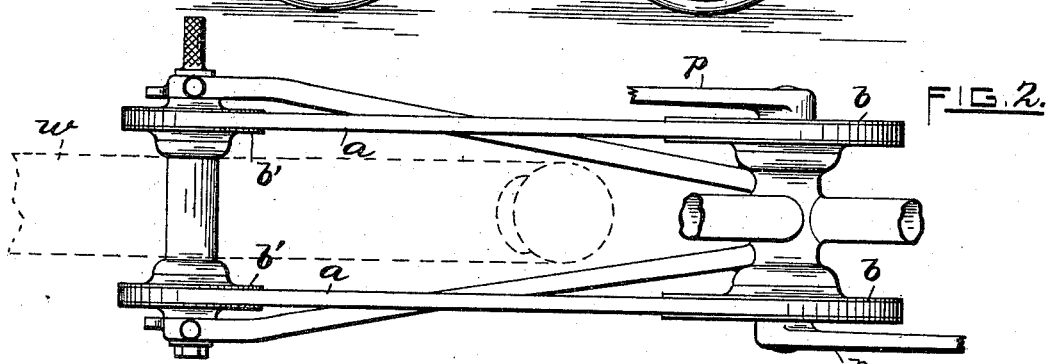
Figure 3:
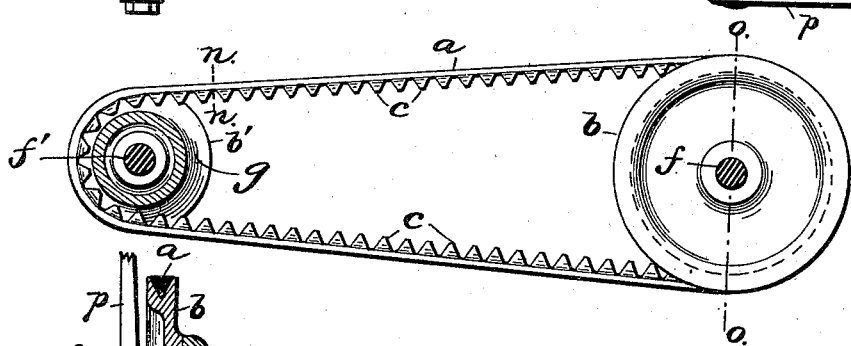
Figure 4:
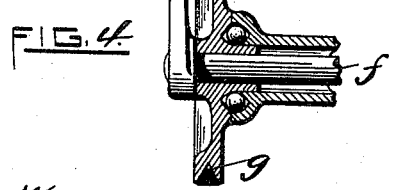
Figure 5:
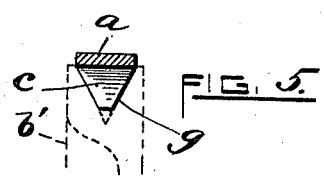

In the accompanying sheet of drawings, Figure 1 is a side elevation of a bicycle provided with my improved flexible driving connection. Fig. 2 is a horizontal section, enlarged, taken on line $x\,x$ of Fig. 1, showing a driving-belt arranged on each side of the bicycle. Fig. 3 is a side elevation of the driving-belt and its wheels or pulleys, the rear wheel being in section. Fig. 4 is a transverse section taken substantially on line $o\,o$ of Fig. 3; and Fig. 5 is an enlarged cross-section of the belt, taken on line $n\,n$ of Fig. 3, showing the relation of the pulley thereto.

Again referring to the drawings, A indicates a bicycle provided with my improved driving-belt $a$. The latter is composed of suitably-treated or vulcanized rubber having silk or other suitable fibers incorporated therein, thus rendering the belt stronger yet at the same time being somewhat elastic. The inner or working side of the belt is provided with serrations or lugs $c$. These are formed integral with the belt and are substantially V-shaped transversely, as clearly shown.

In order to apply my improved belt $a$ to a bicycle, the usual crank or pedal shaft $f$ thereof is provided with a driving-wheel $b$, fixed thereto. The face or edge of the wheel has a V-shaped groove $g$ formed therein, the same being substantially the counterpart of the said lugs $c$. The rear traction-wheel $w$ is provided with a small belt-driving wheel or pulley $b'$, having a groove $g$ therein substantially like the groove formed in said wheel $b$. These belt-wheels $b\,b'$ are or may be mounted and arranged, with respect to the pedal-shaft and the rear driving-wheel $w$, substantially the same as the usual sprocket-chain wheels heretofore employed in velocipedes or vehicles of this type.

The novel feature of my invention and that which gives it such great utility is the conformation of the inner or working face of the belt. The lug $c$ being pyramidal or tapering in shape, it will be readily seen that in passing around the wheels the inward pressure on the lug will force it into the groove, compressing it laterally or transversely of the wheel, this compression being possible because of the freedom of the faces of the lug which are opposite to the preceding and succeeding lugs to correspondingly expand. Thus a very great friction is obtained between the lugs and the wheel and "slip" or lost motion is entirely avoided.

Further important advantages attained are that by means of my improved driving-belt $a$ and wheels $b\,b'$ a bicycle can be propelled with greater ease. The weight of the driving connection is much less than sprocket-chain gearing or toothed wheels. It is practically noiseless. It is less expensive than other forms of driving mechanism hitherto employed on vehicles of this class. It will work perfectly even when the driving-wheels are not in alinement. It is somewhat elastic or yielding. Consequently the rider can operate the vehicle with less fatigue.

Another advantage possessed by my improved driving connection is that it requires no oil or lubricating medium whatever. Therefore it remains practically clean at all times, since any dust collected thereon may be readily brushed off.

I claim as my invention and desire to secure by United States Letters Patent—

The combination, with a wheel having a tapering or wedge-shaped groove, of a belt having frictional engagement with said wheel wholly in said groove, said belt tapering in cross-section to correspond with the groove of the wheel, and its narrower portion being divided into lugs having converging front and rear faces, and of substantially the same length as breadth, whereby said belt may be wedged into the groove, the lateral compression of the lugs being permitted by their longitudinal expansion, substantially as described.

In testimony whereof I have affixed my signature in presence of two witnesses.

LUTHER H. WATTLES.

Witnesses:
WM. B. SHERMAN,
GEO. H. REMINGTON.